W. E. KINERT.
Churn.

No. 85,452. Patented Dec. 29, 1868.

Witnesses:
John A. McFadden
A. W. Livingston

Inventor:
William E. Kinert

United States Patent Office.

WILLIAM E. KINERT, OF BLUFFTON, INDIANA.

Letters Patent No. 85,452, dated December 29, 1868.

IMPROVEMENT IN CHURNS.

The Schedule referred to in these Letters Patent and making part of the same.

*To all whom it may concern:*

Be it known that I, WILLIAM E. KINERT, of Bluffton, in the county of Wells, and State of Indiana, have invented a new and useful Improvement in Churns, of which the following is a full and clear description, reference being had to the accompanying drawings, making part of this specification.

My improvement in churns relates to the construction and arrangement of rotating dashers, connected together by a series of gear-wheels, by which they are caused to rotate in the same direction; also to journal-boxes, so constructed and arranged, with reference to the axles of the dashers, that the milk being churned shall not escape between the axles and boxes.

A is the barrel of the churn, having the circular bottom $a$.

The dashers B B' are similar in construction, consisting of end-strips $b$ and $b'$, to which are secured the longitudinal dash-boards $c$ $c'$, concave on the sides which impinge upon the milk.

The end-strips $b'$ are provided with axle-projections $d$, journalled in the end of the barrel A of the churn.

Axles $e$, provided with square-ends $e'$, entered in the sockets, of corresponding size and shape, in the end-strips $b$, extend without the end of the churn; and are journalled in a stirrup-bar, $f$, and in the boxes $g$. The journals of the axles housed in the boxes $g$ are of less diameter than the rest of the axles.

A slide-gate, $h$, is provided in each of the boxes $g$, which are secured to the exterior face of the end of the barrel of the churn. The slides have their ends, that are in contact with the axles, of circular form, to conform with the journal of the axles $e$.

Each axle $e$ has secured to it, immediately without the boxes $g$, pinions $j$, which engage the larger gear-wheel $k$.

The gear-wheel $k$ is secured to the shaft $l$, having its journal-bearings in the stirrup-bar $f$ and the end of the churn-barrel.

To the end of the shaft $l$, exterior to the stirrup-bar $f$, is made fast the winch $m$.

Figure 1:
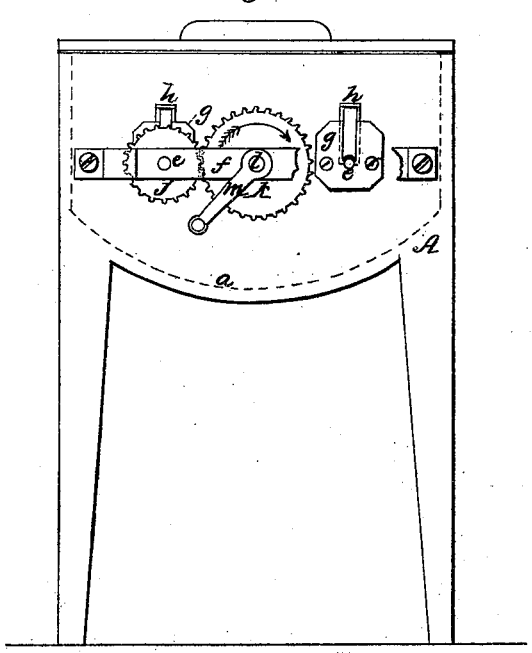
Figure 1 is an elevation of my improved churn.
Figure 2:
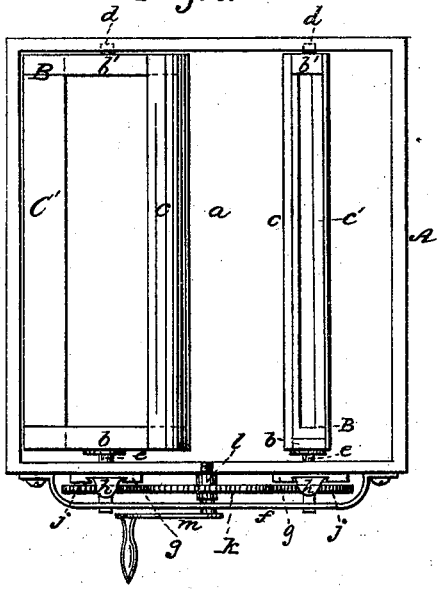
Figure 2 is a plan of the same, having the cover removed.
Figure 3:
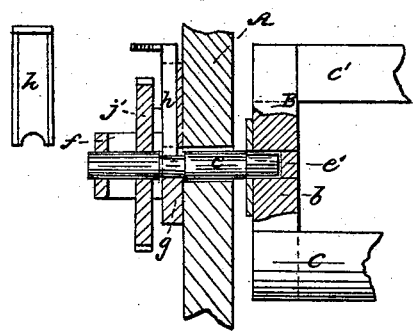
Figure 3 is a transverse vertical section of the churn, the section being taken in the plane of the axle of one of the dashers.

The proper motion is imparted to the winch $m$ by the operator, indicated by the arrow in fig. 1. The gear-wheel $k$ engages, on opposite sides, the pinions $j$, on the axles of the dashers. The rotation of the dashers B B' is in the same direction; and, since the concave faces of the dash-boards $c$ $c'$ are towards the direction of their rotation, and one dash-board, $c$, moving up through the milk, passes the opposite dash-board, $c'$, going down, the agitation of the milk is greatly and desirably increased, the corpuscles, or sacks containing the butter, are quickly broken, and the coalescence of the fatty particles immediately follows.

The entire operation is facilitated by giving to the dash-boards the concave surfaces above described, for a much more violent agitation of the milk must result where there is the least amount of "slip," which there is in the dash-boards having plane surfaces.

When it is necessary to remove the dashers B B', the slides $h$ are elevated, the axles $e$ $e$ drawn out of their sockets in the end-strips $b$ $b$, and the dashers may be removed.

The slides $h$, when in their places in the boxes $g$, fit close about the journals of the axles $e$ $e$, preventing the escape of milk when the churn is being operated.

What I claim as new, and desire to secure by Letters Patent, is—

The dashers B B', when provided with curved paddles $c$ $c$, wheels J J and K, and axles $e$ $e$, the slotted boxes $g$ $g$, and the slides $h$ $h$, all substantially as herein shown and described.

WM. E. KINERT.

Witnesses:
C. L. FISHER,
M. L. DOHERTY.